(12) United States Patent
Suzuki

(10) Patent No.: US 10,294,840 B2
(45) Date of Patent: May 21, 2019

(54) EXHAUST GAS PURIFICATION SYSTEM FOR INTERNAL COMBUSTION ENGINE

(71) Applicant: Toyota Jidosha Kabushiki Kaisha, Toyota-shi, Aichi-ken (JP)

(72) Inventor: Hayato Suzuki, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 62 days.

(21) Appl. No.: 15/727,034

(22) Filed: Oct. 6, 2017

(65) Prior Publication Data

US 2018/0100419 A1 Apr. 12, 2018

(30) Foreign Application Priority Data

Oct. 7, 2016 (JP) .................................. 2016-198935

(51) Int. Cl.
*F01N 3/20* (2006.01)
*F01N 3/08* (2006.01)
(Continued)

(52) U.S. Cl.
CPC ........... *F01N 3/206* (2013.01); *F01N 3/0814* (2013.01); *F01N 3/0842* (2013.01);
(Continued)

(58) Field of Classification Search
CPC ...... F01N 3/0814; F01N 3/0842; F01N 3/206; F01N 2610/03; F01N 2900/1404; F01N 2900/1602; F01N 2900/1631; F01N 3/2033; F01N 9/00; F02D 41/0025; F02D 41/0245; F02D 41/0275; F02D 41/40; F02D 2041/0265; F02D 2200/0602; F02D 2200/0611; Y02T 10/24; Y02T 10/26; Y02T 10/44
See application file for complete search history.

(56) References Cited

FOREIGN PATENT DOCUMENTS

EP 1515015 A2 3/2005
JP 2005083352 A 3/2005

OTHER PUBLICATIONS

Suzuki, Hayato, "Exhaust gas purification device for internal combustion engine", Journal of Technical Disclosure No. 2016-500995, Japan Institute for Promoting Invention and Innovation, Apr. 1, 2016.

*Primary Examiner* — Brandon D Lee
(74) *Attorney, Agent, or Firm* — Dinsmore & Shohl LLP

(57) ABSTRACT

When the temperature of the exhaust gas flowing into an NSR catalyst exceeds a specific threshold temperature that is determined on the basis of the cetane number of fuel in such a way that the specific threshold temperature is set lower when the cetane number of the fuel is low than when it is high, fuel is supplied to the exhaust gas by fuel supply device to perform an $NO_X$ reduction process for the NSR catalyst. If the quantity of heat generated in the NSR catalyst per unit time is smaller than a specific value while the $NO_X$ reduction process is being performed, the $NO_X$ reduction process in progress is suspended, and the $NO_X$ reduction process is performed later on when the temperature of the exhaust gas flowing into the NSR catalyst exceeds an updated threshold temperature higher than the specific threshold temperature.

3 Claims, 7 Drawing Sheets

(51) Int. Cl.
  *F02D 41/02* (2006.01)
  *F02D 41/40* (2006.01)
  *F02D 41/00* (2006.01)
  *F01N 9/00* (2006.01)
(52) U.S. Cl.
  CPC ..... *F02D 41/0025* (2013.01); *F02D 41/0245* (2013.01); *F02D 41/0275* (2013.01); *F02D 41/40* (2013.01); *F01N 3/2033* (2013.01); *F01N 9/00* (2013.01); *F01N 2610/03* (2013.01); *F01N 2900/1404* (2013.01); *F01N 2900/1602* (2013.01); *F01N 2900/1631* (2013.01); *F02D 2041/0265* (2013.01); *F02D 2200/0602* (2013.01); *F02D 2200/0611* (2013.01); *Y02T 10/24* (2013.01); *Y02T 10/26* (2013.01); *Y02T 10/44* (2013.01)

EXHAUST GAS PURIFICATION SYSTEM FOR INTERNAL COMBUSTION ENGINE

CROSS-REFERENCE TO RELATED APPLICATIONS

This application claims priority to Japanese Patent Application No. 2016-198935, filed on Oct. 7, 2016, which is hereby incorporated by reference herein in its entirety.

BACKGROUND

Technical Field

The present disclosure relates to an exhaust gas purification system for an internal combustion engine.

Background Art

Internal combustion engines are provided with a filter arranged in the exhaust passage to prevent or reduce emissions of particulate matter (which will be hereinafter referred to as "PM") in the exhaust gas to the external environment. PM in the exhaust gas is gradually deposited in this filter as the operation of the internal combustion engine continues. To avoid clogging of the filter, a filter regeneration process is performed (see, for example, Patent Literature 1). In the case of diesel engines, in which the exhaust gas has, in general, a lean air-fuel ratio higher than the theoretical air fuel ratio continuously, a filter regeneration process is performed by supplying unburned fuel to the exhaust gas to raise the temperature of the exhaust gas using an oxidation catalyst or the like provided in the exhaust passage, thereby removing the PM trapped in the filter by oxidation.

In that case, to carry out the filter regeneration process successfully, it is necessary that the fuel supplied to the exhaust gas be oxidized by the oxidation catalyst, and it is desirable that the fuel be in a sufficiently vaporized state in the oxidation catalyst in order for the oxidation reaction to progress smoothly. However, properties (in particular the volatility) of diesel engine fuels available in the market are not always uniform but vary to some extent. A countermeasure to such variations is disclosed in, for example, Non-patent Literature 1. In the technology disclosed in Non-patent Literature 1, the cetane number of fuel, which correlates with the volatility of fuel to some extent, is estimated, and the threshold of the exhaust gas temperature at which supply of fuel for the filter regeneration process is started is adjusted taking account of the estimated cetane number.

PATENT LITERATURE

Patent Literature 1: Japanese Patent Application Laid-Open No. 2005-83352

NON-PATENT LITERATURE

Non-patent Literature 1: Journal of Technical Disclosure No. 2016-500995, Japan Institute for Promoting Invention and Innovation

SUMMARY

There are known exhaust gas purification systems for an internal combustion engine that use an $NO_X$ storage reduction catalyst (which will be hereinafter referred to as the "NSR catalyst"), which stores (or absorbs) $NO_X$ contained in the exhaust gas when the exhaust gas has a lean air-fuel ratio higher than the theoretical air-fuel ratio and desorbs $NO_X$ stored therein to let the desorbed $NO_X$ be reduced by unburned fuel in the exhaust gas when the exhaust gas has a rich air fuel-ratio lower than the theoretical air-fuel ratio. The $NO_X$ storage capacity of the NSR catalyst is limited, and gradual increase in the amount of $NO_X$ stored in the NSR catalyst with continuous operation of the internal combustion engine that makes the air-fuel ratio of the exhaust gas lean can lead to saturation of the $NO_X$ storage capacity. To avoid the saturation, exhaust gas purification systems for an internal combustion engine having an NSR catalyst are configured to perform an $NO_X$ reduction process for desorbing and reducing $NO_X$ stored in the NSR catalyst when necessary. For example, in the $NO_X$ reduction process in diesel engines, in which the air-fuel ratio of the exhaust gas is continuously lean, desorption and reduction of $NO_X$ stored in the NSR catalyst is carried out by supplying fuel to the exhaust gas to thereby make the air-fuel ratio of the exhaust gas flowing into the NSR catalyst rich.

In the case where fuel is supplied to the exhaust gas in the $NO_X$ reduction process, if the exhaust gas temperature at which the supply of fuel is to be started is low, reduction of $NO_X$ by fuel in the NSR catalyst does not progress satisfactorily, and problems such as adhesion of fuel to the NSR catalyst will arise. A countermeasure to this is, as suggested by the aforementioned prior art, to perform the fuel supply taking account of the cetane number of the fuel so that fuel can be supplied at as low a temperature as possible while allowing reduction of $NO_X$ by fuel in the NSR catalyst, thereby increasing the chance of performing the $NO_X$ reduction process.

However, it is true that the cetane number of fuels for internal combustion engines are a value that correlates with the volatility of fuels to some extent, but the cetane number originally is an indicator relating to the self-ignitability of fuels. If fuel supply for the $NO_X$ reduction process is performed on the basis of the cetane number, there may be cases where fuel supply is conducted in circumstances in which sufficient reduction of $NO_X$ by fuel in the NSR catalyst cannot be expected according to properties of the fuel. In such cases, problems such as deterioration in the activity of the NSR catalyst due to adhesion of fuel to the NSR catalyst will arise.

The present disclosure has been made in view of the above-described problem, and an object of the present disclosure is to enable an exhaust gas purification system for an internal combustion engine having an NSR catalyst to bring about satisfactory reduction of $NO_X$ by fuel in the NSR catalyst and to allow fuel supply to be performed at as low a temperature as possible.

According to the present disclosure, to solve the above problem, a threshold of the exhaust gas temperature for performing an $NO_X$ reduction process (i.e. a process of reducing $NO_X$) is determined on the basis of the cetane number of the fuel of the internal combustion engine. Moreover, when the quantity of heat generated in the NSR catalyst by the $NO_X$ reduction process is not sufficient, the threshold of the exhaust gas temperature for performing an $NO_X$ reduction process is adjusted to a higher temperature. Thus, reduction of $NO_X$ by fuel in the NSR catalyst can be achieved sufficiently taking account of the volatility of the fuel.

Specifically, according to the present disclosure, there is provided an exhaust gas purification system for an internal combustion engine including an NSR catalyst provided in an exhaust passage of an internal combustion engine, which stores $NO_X$ in exhaust gas when the exhaust gas has a lean air-fuel ratio higher than the theoretical air-fuel ratio and desorbs $NO_X$ stored in it to let the desorbed $NO_X$ be reduced by unburned fuel in the exhaust gas when the exhaust gas has a rich air-fuel ratio lower than the theoretical air-fuel ratio, fuel supply device for supplying fuel to the exhaust gas upstream of the NSR catalyst, and a controller comprising at least one processor. The controller is configured to:

determine, after fuel is supplied to a fuel tank of the internal combustion engine, the cetane number of the fuel used in the internal combustion engine after the supply of fuel; and perform an $NO_X$ reduction process by supplying fuel to the exhaust gas through the fuel supply device when the amount of $NO_X$ stored in the NSR catalyst is larger than or equal to a specific $NO_X$ storage amount and the temperature of the exhaust gas flowing into the NSR catalyst exceeds a specific threshold temperature that is determined on the basis of the cetane number of the fuel in such a way that the specific threshold temperature is set lower when the cetane number of the fuel is low than when the cetane number of the fuel is high. When the quantity of heat generated in the NSR catalyst per unit time is smaller than a specific value while the $NO_X$ reduction process is being performed, the controller suspends the $NO_X$ reduction process in progress, and performs the $NO_X$ reduction process later on when the temperature of the exhaust gas flowing into the NSR catalyst exceeds an updated threshold temperature higher than the specific threshold temperature.

Having the NSR catalyst provided in the exhaust passage, the exhaust gas purification system according to the present disclosure stores (or absorbs) $NO_X$ in the exhaust gas when the exhaust gas has a lean air-fuel ratio to reduce emission of $NO_X$ to the external environment. In this exhaust gas purification system, increases in the amount of $NO_X$ stored in the NSR catalyst can lead to saturation of the $NO_X$ storage capacity of the NSR catalyst. To avoid this, the fuel supply device is provided to desorb and reduce $NO_X$ stored in the NSR catalyst when the amount of $NO_X$ stored in the NSR catalyst reaches or exceeds the specific $NO_X$ storage amount. As fuel is supplied to the exhaust gas by the fuel supply device, the exhaust gas flowing into the NSR catalyst has a rich air-fuel ratio, causing $NO_X$ stored in the NSR catalyst to be desorbed and reduced. The specific $NO_X$ storage amount mentioned above is an amount smaller than the saturation storage amount (i.e. the $NO_X$ storage amount that saturates the $NO_X$ storage capacity of the NSR catalyst 3).

In the reduction reaction of $NO_X$ in the NSR catalyst, the higher the volatility of the fuel is, the more excellently the reduction reaction progresses. Therefore, if the volatility of a fuel is high, the fuel is allowed to be supplied to the exhaust gas when the exhaust gas temperature is relatively low, so that reduction of $NO_X$ stored in the NSR catalyst is facilitated. In the above-described exhaust gas purification system, the controller is configured to adjust the timing of fuel supply through the fuel supply device on the basis of the cetane number of fuel. The cetane number correlates with the volatility of fuel to some extent. Specifically, the smaller the cetane number of fuel is, the higher the volatility tends to be generally. Therefore, the specific threshold temperature serving as a threshold of the exhaust gas temperature at which the supply of fuel to the exhaust gas is to be started is set lower when the cetane number of fuel is low than when it is high. The aforementioned controller supplies fuel to the exhaust gas for the $NO_X$ reduction process according to the specific threshold temperature that is determined on the basis of the cetane number of fuel. Thus, fuel can be supplied to the exhaust gas at an exhaust gas temperature appropriate for the fuel used in the internal combustion engine, or at as low an exhaust gas temperature as possible. Thus, the chance of performing the $NO_X$ reduction process can be increased.

The cetane number of fuel is determined by the controller. Although the cetane number of the fuel is correlated with the volatility of fuel to some extent, the actual volatility of the fuel is not always agreed with the volatility estimated from the cetane number of the fuel. This is because the cetane number is an indicator of the self-ignitability of fuel. There may be cases where the aforementioned specific threshold temperature that is set on the basis of the cetane number determined by the controller is not suited to the actual volatility of fuel. In such cases, if fuel is supplied to the exhaust gas according to the specific threshold temperature for the $NO_X$ reduction process, there may be cases where the desorption and reduction of $NO_X$ in the NSR catalyst does not progress satisfactorily.

In the exhaust gas purification system for an internal combustion engine according to the present disclosure, when the quantity of heat generated by the reaction of fuel and $NO_X$ in the NSR catalyst per unit time is smaller than the specific value while the $NO_X$ reduction process is being performed, the supply of fuel to the exhaust gas through the fuel supply device is stopped to suspend the $NO_X$ reduction process that is in progress at that time. The specific value mentioned above is the quantity of heat expected to be generated per unit time by the reaction of fuel supplied to the NSR catalyst with the exhaust gas and $NO_X$ stored in the NSR catalyst in the $NO_X$ reduction process performed taking account of the cetane number of the fuel. In other words, the specific value is set equal to the heat of reaction that would be generated when a quantity of fuel supplied though the fuel supply device per unit time during the $NO_X$ reduction process reacts with $NO_X$ stored in the NSR catalyst in the case where the fuel supplied through the fuel supply device has a volatility that is assumed on the basis of the cetane number. Therefore, if the quantity of heat generated in the NSR catalyst per unit time during the $NO_X$ reduction process is smaller than this specific value, there is a possibility that the actual volatility of the fuel may be lower than the volatility of the fuel that is assumed on the basis of the cetane number. If the $NO_X$ reduction process is continued in such a condition, undesirable circumstances such as the adhesion of fuel to the NSR catalyst leading to a decrease in the activity can arise. Therefore, when the quantity of heat generated in the NSR catalyst per unit time is smaller than the specific value, the $NO_X$ reduction process that is in progress at that time is suspended as descried above. Then, since there is a possibility that the volatility of the fuel is lower than assumed, the threshold of the exhaust gas temperature for performing the $NO_X$ reduction process is changed to an updated threshold temperature higher than the specific threshold temperature that is determined on the basis of the cetane number determined by the controller. Consequently, the $NO_X$ reduction process is performed in a condition in which the exhaust gas temperature is higher. Therefore, even if the actual volatility of the fuel is lower than the volatility that is assumed on the basis of the cetane number, reduction of $NO_X$ by fuel will progress satisfactorily in the NSR catalyst.

As described above, in the exhaust gas purification system for an internal combustion engine according to the present disclosure, the threshold of the exhaust gas temperature at which the supply of fuel to the exhaust gas for the $NO_X$ reduction process is to be started is determined on the basis of the cetane number of the fuel. Moreover, if the temperature of the exhaust gas is not sufficiently raised by the heat of reaction generated in the NSR catalyst when the supply of fuel is performed according to this threshold, the supply of fuel is stopped and the threshold is updated to a higher value. Thus, the supply of fuel is allowed to be performed at as low a temperature as possible on the basis of the cetane number of fuel, and satisfactory reaction of fuel and $NO_X$ in the NSR catalyst is ensured in the $NO_X$ reduction process. Therefore, it is possible to increase the chance of performing the $NO_X$ reduction process.

In the above-described exhaust gas purification system for an internal combustion engine, the controller may be further configured to perform, when the air-fuel ratio of the exhaust gas to which fuel has been supplied by the fuel supply device is leaner than a specific air-fuel ratio suited to the $NO_X$ reduction process while the $NO_X$ reduction process is being performed, a fuel-increasing process of increasing the quantity of fuel supplied through the fuel supply device in the $NO_X$ reduction process so as to make the air-fuel ratio of the exhaust gas equal to the specific air-fuel ratio. Moreover, when the quantity of heat generated in the NSR catalyst per unit time reaches or exceeds the specific value while the fuel-increasing process is being performed during the $NO_X$ reduction process, the controller may continue the $NO_X$ reduction process with the fuel-increasing process being performed.

If the quantity of heat generated in the NSR catalyst per unit time is smaller than the specific value while the $NO_X$ reduction process is being performed, there is a possibility that the actual volatility of the fuel is lower than the volatility of the fuel that is assumed on the basis of the cetane number, as described above. Besides, there also is a possibility that the quantity of heat generated in the NSR catalyst per unit time falls short of the specific value because of insufficiency of fuel supply to the exhaust gas by the fuel supply device. In the exhaust gas purification system for an internal combustion engine according to the present disclosure, in cases where the air-fuel ratio of the exhaust gas to which fuel has been supplied in the $NO_X$ reduction process is leaner than the specific air-fuel ratio suited to the $NO_X$ reduction process, namely the air-fuel ratio of the exhaust gas that is expected to be formed on the assumption that a due quantity of fuel to be supplied in the $NO_X$ reduction process is actually supplied, the controller performs the fuel-increasing process. If the quantity of heat generated in the NSR catalyst per unit time reaches or exceeds the specific quantity as a result of performing the fuel-increasing process, it is reasonable to conclude that the possibility that the actual volatility of the fuel is lower than the volatility of the fuel that is assumed on the basis of the cetane number is low. In other words, it is reasonable to conclude that it is probable that the quantity of heat generated in the NSR catalyst per unit time does not reach the specific value due to insufficiency in the quantity of fuel supplied to the exhaust gas through the fuel supply device. Therefore, in cases where the quantity of heat generated in the NSR catalyst per unit time reaches or exceeds the specific value while the fuel-increasing process is being performed, insufficiency in the reduction reaction in the NSR catalyst can be prevented by continuing the $NO_X$ reduction process while performing the fuel-increasing process. In that case, the threshold of the exhaust gas temperature for starting the supply of fuel is not changed.

In the above-described exhaust gas purification system for an internal combustion engine, when the quantity of heat generated in the NSR catalyst per unit time is smaller than the specific value while the fuel-increasing process is being performed during the $NO_X$ reduction process, the controller may suspend the $NO_X$ reduction process and the fuel-increasing process in progress and perform the $NO_X$ reduction process later on when the temperature of the exhaust gas flowing into the NSR catalyst exceeds the updated threshold temperature. In cases where the quantity of heat generated in the NSR catalyst per unit time is smaller than the specific value after the fuel increasing process is performed, it is reasonable to conclude that the possibility that the quantity of heat generated in the NSR catalyst per unit time does not reach the specific value due to insufficiency in the quantity of fuel supplied to the exhaust gas through the fuel supply device is low. In other words, it is reasonable to conclude that it is probable that the actual volatility of the fuel is lower than the volatility of the fuel that is assumed on the basis of the cetane number. Therefore, in cases where the quantity of heat generated in the NSR catalyst per unit time is smaller than the specific value while the fuel-increasing process is being performed, the $NO_X$ reduction process and the fuel-increasing process in progress may be stopped, and the threshold of the exhaust temperature for performing the $NO_X$ reduction process may be changed to the aforementioned updated threshold temperature.

The fuel-increasing process may be performed either after it is determined that the quantity of heat generated in the NSR catalyst per unit time is smaller than the specific value after the start of the $NO_X$ reduction process or before making a determination as to whether or not the quantity of heat generated in the NSR catalyst per unit time is smaller than the specific value after the start of the $NO_X$ reduction process. In either case, the possibility that insufficiency in the desorption and reduction of $NO_X$ stored in the NSR catalyst (which will be referred to as "insufficient reduction") is attributable to insufficiency in the supply of fuel to the exhaust gas by the fuel supply device can be excluded by performing the fuel-increasing process. Therefore, insufficient reduction attributable to the volatility of the fuel can be addressed appropriately.

The present disclosure enables an exhaust gas purification system for an internal combustion engine having an NSR catalyst to bring about satisfactory reduction of $NO_X$ by fuel in the NSR catalyst and allows fuel supply to be performed at as low a temperature as possible.

Further features of the present disclosure will become apparent from the following description of exemplary embodiments with reference to the attached drawings.

DESCRIPTION OF THE EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

First Embodiment

Figure 1:
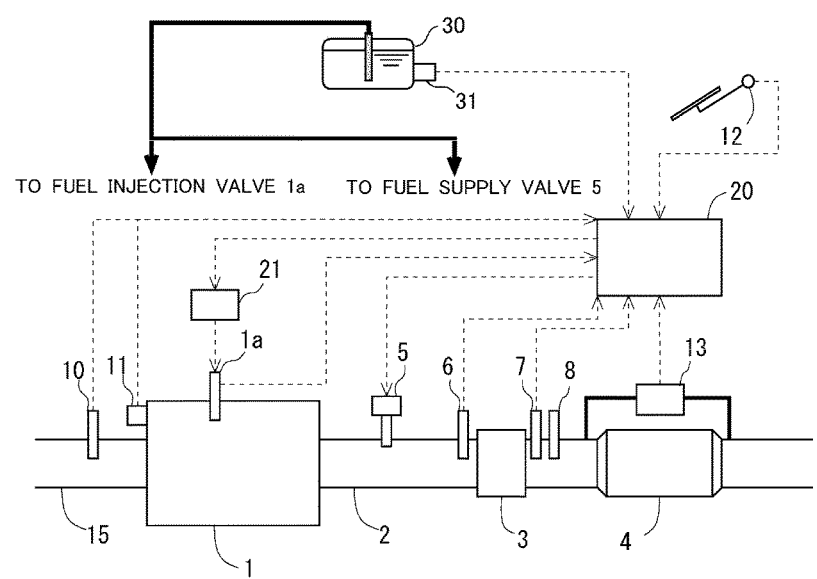
FIG. 1 is a diagram showing the general configuration of an exhaust gas purification system for an internal combustion engine according to the present disclosure.

FIG. 1 shows the general configuration of an exhaust gas purification system for an internal combustion engine 1 according to the present disclosure. The internal combustion engine 1 shown in FIG. 1 is a diesel engine for driving a vehicle. The internal combustion engine operates by burning an air-fuel mixture having a lean air-fuel ratio higher than the theoretical air-fuel ratio. The internal combustion engine 1 is connected with an exhaust passage 2. The exhaust passage 2 is provided with an NSR catalyst 3, which stores $NO_X$ contained in the exhaust gas when the exhaust gas has a lean air-fuel ratio and desorbs $NO_X$ stored therein to let the desorbed $NO_X$ be reduced by unburned fuel in the exhaust gas when the exhaust gas has a rich air fuel-ratio. The exhaust passage 2 is also provided with a particulate filter 4 (which will be simply referred to as the "filter" hereinafter) that traps PM in the exhaust gas, which is arranged downstream of the NSR catalyst 3.

The exhaust passage 2 is also provided with a fuel supply valve 5 arranged upstream of the NSR catalyst 3. The fuel supply valve 5 supplies fuel (unburned fuel) to the exhaust gas flowing into the NSR catalyst 3. The exhaust passage 2 is provided with a first temperature sensor 6 and a second temperature sensor 7. The first temperature sensor 6 is arranged upstream of the NSR catalyst 3 to measure the temperature of the exhaust gas flowing into the NSR catalyst 3, and the second temperature sensor 7 is arranged downstream of the NSR catalyst 3 to measure the temperature of the exhaust gas flowing out of the NSR catalyst 3. The exhaust passage 2 is provided with an air-fuel ratio sensor 8, which is arranged downstream of the NSR catalyst 3 to measure the air-fuel ratio of the exhaust gas flowing out of the NSR catalyst 3. The exhaust passage 2 is also provided with a differential pressure sensor 13, which are arranged near the filter 4. The differential pressure sensor measures the differential pressure of the exhaust gas across the filter 4, namely the difference between the exhaust gas pressure in the exhaust passage 2 upstream of the filter 4 and the exhaust gas pressure in the exhaust passage 2 downstream of the filter 4.

The intake passage 15 of the internal combustion engine 1 is provided with an air flow meter 10 capable of measuring the flow rate of the intake air flowing in the intake passage 15. An electronic control unit (ECU) 20 is provided for the internal combustion engine 1. The ECU 20 controls the operation state of the internal combustion engine 1. The ECU 20 is electrically connected with the fuel supply valve 5, the first temperature sensor 6, the second temperature sensor 7, the air-fuel ratio sensor 8, the differential pressure sensor 13, the air flow meter 10, a crank position sensor 11, and an accelerator opening degree sensor 12. The fuel supply valve 5 controls supply of fuel to the exhaust gas according to instructions from the ECU 20. Measurement values of the sensors are given to the ECU 20. For example, the crank position sensor 11 measures the crank angle of the internal combustion engine 1 and sends it to the ECU 20. The accelerator opening degree sensor 12 measures the accelerator opening degree of the vehicle provided with the internal combustion engine 1 and sends it to the ECU 20. The ECU 20 calculates the engine speed of the internal combustion engine 1 from the measurement value of the crank position sensor 11 and calculates the engine load of the internal combustion engine 1 from the measurement value of the accelerator opening degree sensor 12. Moreover, the ECU 20 can determine the temperature of the exhaust gas flowing into the NSR catalysts 3 on the basis of the measurement value of the first temperature sensor 6 and estimate the temperature of the NSR catalyst 3 on the basis of the measurement value of the second temperature sensor 7. The ECU 20 can determine the state of deposition of PM in the filter 4 on the basis of the measurement value of the differential pressure sensor 13.

The internal combustion engine 1 has a plurality of cylinders, each of which is provided with a fuel injection valve 1a. The fuel injection valve 1a has a pressure sensor (not shown) built in it, and the fuel injection pressure measured by the pressure sensor is sent to the ECU 20. The ECU 20 sends a drive command to an ejection drive unit (EDU) 21 on the basis of the engine load and the engine speed of the internal combustion engine 1 and the fuel injection pressure measured by the pressure sensor, and the fuel injection valve 1a is controlled by a drive signal sent from the EDU 21.

Fuel for the internal combustion engine 1 is stored in a fuel rank 30 and supplied to the fuel injection valve 1a and the fuel supply valve 5 through fuel supply lines. The fuel tank 30 is provided with an opening and closing sensor 31 that senses opening and closing of a tank cap that is opened for refueling. The opening and closing sensor 31 informs the ECU 20 of the opening and closing status of the tank cap.

In the exhaust gas purification system for the internal combustion engine 1 configured as above, $NO_X$ contained in the exhaust gas is generally stored into the NSR catalyst 3 to reduce emissions to the environment. Another catalyst for exhaust gas purification that is not shown in the drawings may be additionally provided. If the $NO_X$ storage amount of the NSR catalyst 3 (i.e. the amount of $NO_X$ stored in the NSR catalyst 3) increases to reach the saturation storage amount of the NSR catalyst 3 (i.e. the $NO_X$ storage amount that saturates the $NO_X$ storage capacity of the NSR catalyst 3), there arises a possibility that $NO_X$ that the NSR catalyst 3 does not afford to store is emitted to the external environment. To avoid such circumstances, when the $NO_X$ storage amount in the NSR catalyst 3 reaches or exceeds a predetermined $NO_X$ storage amount, an $NO_X$ reduction process is performed to desorb and reduce $NO_X$ stored in the NSR catalyst 3. In the $NO_X$ reduction process, specifically, a predetermined quantity of fuel is supplied to the exhaust gas by the fuel supply valve 5 to make the air-fuel ratio of the exhaust gas flowing into the NSR catalyst 3 rich, whereby $NO_X$ stored in the NSR catalyst 3 is desorbed and reduced.

The predetermined $NO_X$ storage amount is set to a value equal to the saturation storage amount minus a certain margin.

When fuel is supplied to the exhaust gas by the fuel supply valve 5 for the $NO_X$ reduction process, it is necessary that $NO_X$ be satisfactorily reduced in the NSR catalyst 3 by the supplied fuel. If the reduction reaction does not progress satisfactorily, there can arise troubles such as a decrease in the activity of the NSR catalyst 3 due to adhesion of supplied fuel to the NSR catalyst 3. Volatility of fuel is important in order for the reduction of $NO_X$ by fuel to progress satisfactorily in the NSR catalyst 3. More specifically, the higher the volatility of fuel is, the more the reduction reaction is likely to progress satisfactorily in the NSR catalyst 3. If the volatility of fuel is high, fuel can be supplied to the exhaust gas without causing the aforementioned trouble even if the temperature of the NSR catalyst 3 is relatively low, namely even if the temperature of the exhaust gas flowing into the NSR catalyst 3 is relatively low. Then, the chance of performing the $NO_X$ reduction process is increased.

Figure 2:
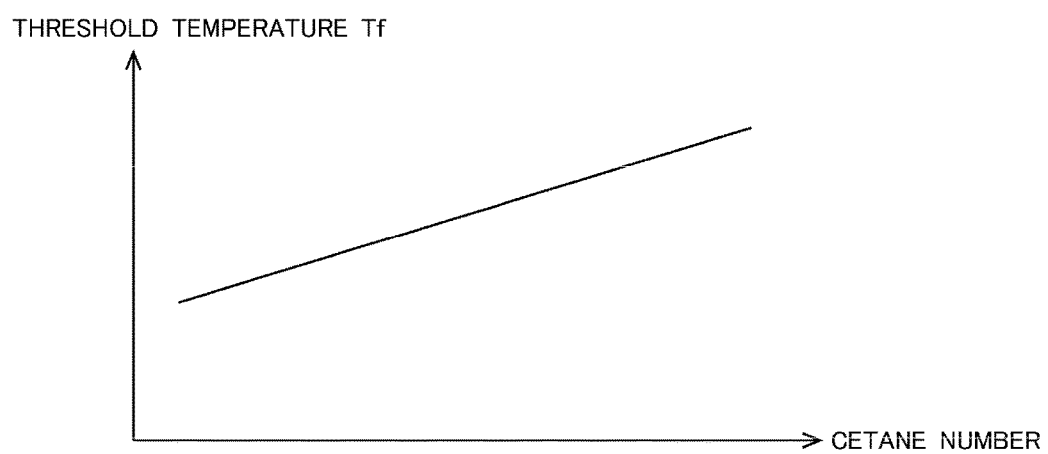
FIG. 2 is a graph showing relationship between the cetane number of fuels used in an internal combustion engine and a threshold Tf of the exhaust gas temperature for starting an $NO_X$ reduction process that is determined on the basis of the cetane number.

Given the above-described relationship between the volatility of fuel and the reduction reaction in the NSR catalyst 3, the exhaust gas purification system for the internal combustion engine 1 according to the present disclosure is configured to adjust a threshold temperature Tf according to the cetane number of fuel, which correlates with the volatility of fuel to some extent. The threshold temperature Tf is a threshold of the exhaust gas temperature (namely, the temperature of the exhaust gas flowing into the NSR catalyst 3) for performing the $NO_X$ reduction process. Generally speaking, the smaller the cetane number is, the higher the volatility of fuel tends to be. Therefore, in the exhaust gas purification system for the internal combustion engine 1 according to the present disclosure, the smaller the cetane number of fuel is, the smaller the value of the threshold temperature Tf is set, as shown in FIG. 2. By setting this relationship between the threshold temperature Tf for the $NO_X$ reduction process and the cetane number, the value of the threshold temperature Tf is set small when a fuel having high volatility (i.e. having a small cetane number) is supplied to the internal combustion engine 1, because the reduction of $NO_X$ by fuel in the $NO_X$ catalyst 3 tends to progress more excellently with such a fuel. Thus, it is possible to increase the chance of performing the $NO_X$ reduction process.

Figure 3:
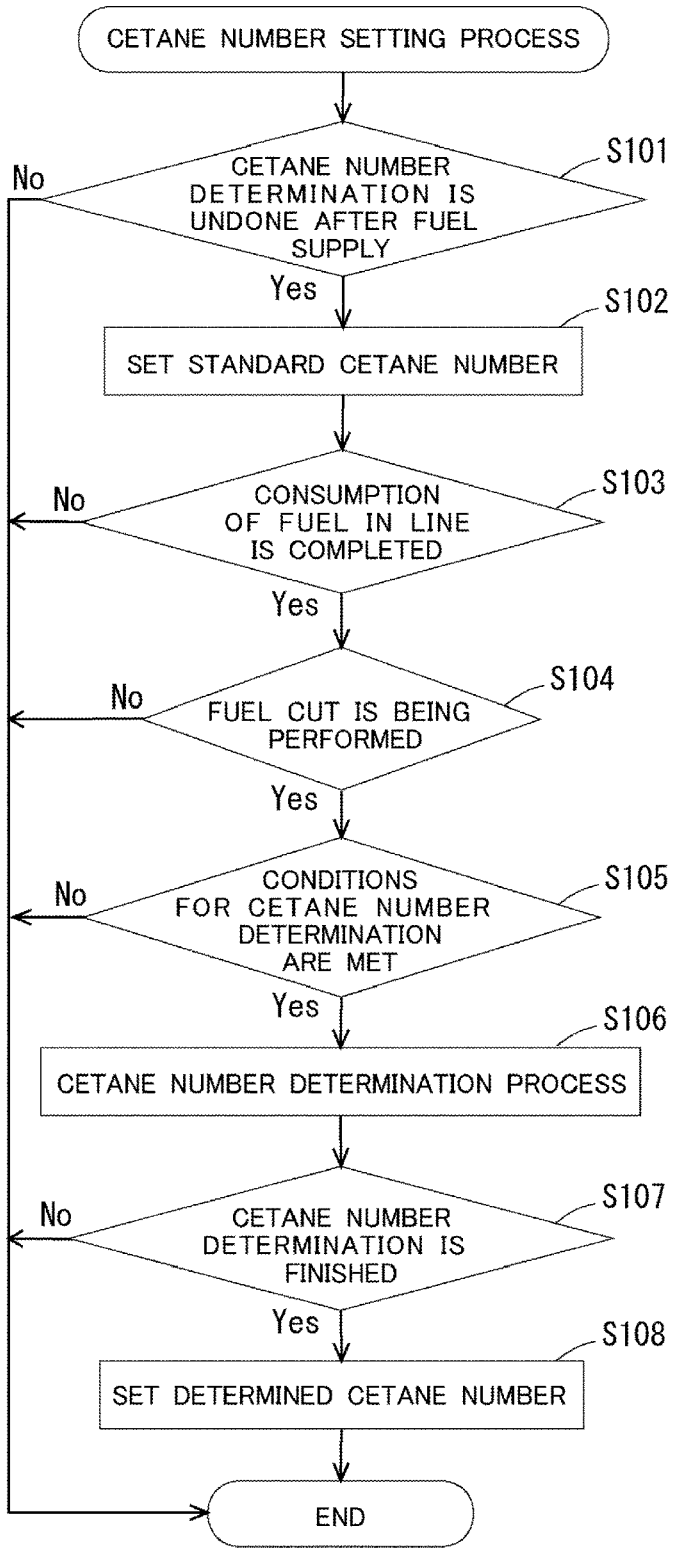
FIG. 3 is a flow chart of a cetane number setting process executed in the exhaust gas purification system for an internal combustion engine shown in FIG. 1.

Now, setting of the cetane number of fuel needed to carry out the $NO_X$ reduction process according to the cetane number of fuel will be described with reference to FIG. 3. FIG. 3 is a flow chart of the process of setting the cetane number of fuel used in the internal combustion engine 1. This cetane number setting process is a control process that is performed repeatedly by execution of a certain control program in the ECU 20. Firstly in step S101, it is determined whether or not the determination of the cetane number by the cetane number determination process executed in step S106 (described later) has been undone since the supply of fuel to the fuel tank 30 (or refueling). In detecting the supply of fuel to the fuel tank 30, it may be determined that the supply of fuel to the fuel tank 30 is performed when the opening and closing sensor 31 detects the opening of the tank cap. Alternatively, the supply of fuel may be detected by measuring the amount of fuel contained in the fuel tank 30 by another sensor. When the supply of fuel to the fuel tank 30 is performed, there is a possibility that the cetane number of the fuel in the fuel tank 30 may be different from the cetane number that has been known before, namely there is a possibility that the cetane number of the fuel becomes unknown. In the case where the supply of fuel to the fuel tank 30 was performed and the determination of the cetane number by the cetane number determination process in step S106 has been undone after that, an affirmative determination is made in step S101, and the process proceeds to step S102. In the case where the determination of cetane number has been done, a negative determination is made in step S101, and this cetane number setting process is terminated.

In step S102, since the cetane number of fuel after the supply of fuel is unknown, a standard cetane number is set as a provisional cetane number of fuel. The standard cetane number may be set to a value, in the range of cetane numbers that common fuels available in the market can have (e.g. between 45 and 60), that makes the threshold temperature Tf as high as possible in order to avoid adhesion of fuel to the NSR catalyst 3, namely the highest cetane number in that range. Alternatively, the standard cetane number may be set to the cetane number used before the supply of fuel is performed this time, namely the cetane number determined by the cetane number determination process performed after the previous time fuel supply. After the completion of the processing of step S102, the process proceeds to step S103.

In step S103, it is determined whether or not the fuel in the fuel supply line (including the common rail) between the fuel tank 30 and the fuel injection valve 1a has been consumed completely. It is probable that the fuel of the kind used before the supply of fuel to the fuel tank 30 is remaining in the fuel supply line. As will be described later, in the cetane number determination process in step S106, the cetane number of the new fuel is determined on the basis of the rotational fluctuation that occurs when a small quantity of fuel is injected through the fuel injection valve 1a. Therefore, it is undesirable that the old (or previous kind of) fuel is remaining in the fuel supply line when the cetane number determining process is performed. In step S103, if the integrated amount of fuel consumed by operation of the internal combustion engine 1 after the supply of fuel to the fuel tank 30 exceeds the amount equal to the capacity of the fuel supply line, it may be determined that the fuel in the fuel supply line has been consumed completely. If an affirmative determination is made in step S103, the process proceeds to step S104. If a negative determination is made, the cetane number setting process is terminated.

In step S104, it is determined whether or not fuel cut process is being performed in the internal combustion engine 1. The fuel cut process is the process of suspending the fuel injection by the fuel injection valve 1a, for example, during deceleration of the internal combustion engine 1. If an affirmative determination is made in step S104, the process proceeds to step S105. If a negative determination is made, the cetane number setting process is terminated.

In step S105, it is determined whether or not conditions for determining the cetane number of fuel are met. Specifically, the conditions for determining the cetane number are met when the following two conditions are both met. The first condition is that the high load operation or the low load operation was not performed in the internal combustion engine 1 immediately before the fuel cut process is performed. In the case where the high load operation was performed immediately before the fuel cut process, the temperature of the inner wall of the cylinder of the internal combustion engine 1 during the fuel cut process is relatively high. Then, an environment in which fuel is more apt to be vaporized due to external factors is established. This is not an environment that allows accurate determination of the cetane number, which relates to the volatility of fuel. In the case where the low load operation was performed immediately before the fuel cut process, the temperature of the inner wall of the cylinder of the internal combustion engine 1 during the fuel cut process is relatively low. Then, an environment in which fuel is less apt to be vaporized due to external factors is established. This is not an environment that allows accurate determination of the cetane number, which relates to the volatility of fuel. Hence, in the above cases, it is determined that the condition for determining the cetane number is not met, because it is difficult to determine the intrinsic volatility of the fuel accurately in these cases.

The second condition is that the engine speed of the internal combustion engine 1 is lower than a standard engine speed. As will be described later, in the cetane number determination process in step S106, the cetane number is determined on the basis of the rotational fluctuation that occurs when a small quantity of fuel is injected through the fuel injection valve 1a. Therefore, when the engine speed is excessively high at the time of determination, it may be difficult to measure the rotational fluctuation. For this reason, the second condition about the engine speed is set. If it is determined in step S105 that the conditions for determining the cetane number including the first and second conditions are met, the process proceeds to step S106. If it is determined in step S105 that the conditions for determining the cetane number including the first and second conditions are not met, the cetane number setting process is terminated.

In step S106, the cetane number determination process is performed. Specifically, a very small quantity of fuel is injected by the fuel injection valve 1a in one or some of the plurality of cylinders in the internal combustion engine 1 while the fuel cut process is being performed, and the cetane number is calculated on the basis of the fluctuation of the engine speed (or rotational fluctuation) with the combustion of the fuel thus injected. Since the quantity of fuel injected to determine the cetane number is very small, the quantity is controlled using the fuel pressure measured by the pressure sensor provided in the fuel injection valve 1a as described above. When measuring the rotational fluctuation, the fuel injection timing is adjusted in such a way that the ignition of fuel occurs at a specific time, and the cetane number is calculated larger when the rotational fluctuation is large than when it is small. After the completion of the processing of step S106, the process proceeds to step S107.

In step S107, it is determined whether or not the determination of the cetane number of the fuel has been done by the above-described cetane number determination process. If an affirmative determination is made in step S107, the process proceeds to step S108. If a negative determination is made, the cetane number setting process is terminated. In step S108, the cetane number of the fuel used in the internal combustion engine 1 after the supply of fuel is set to the cetane number determined by the above-described cetane number determination process, and then the cetane number setting process is terminated.

As above, in the cetane number setting process shown in FIG. 3, after the supply of fuel to the fuel tank 30 is performed in the internal combustion engine 1, the standard cetane number is set as a provisional cetane number of the fuel until the completion of the cetane number determination process. After the completion of the cetane number determination process, the cetane number determined by the cetane number determination process is set as the proper cetane number of the fuel. The cetane number thus set is used in calculation of the threshold temperature Tf for the $NO_X$ reduction process based on the relationship shown in FIG. 2.

As described above, the volatility of the fuel is generally correlated with the cetane number of the fuel, but there are fuels of which the actual volatility of the fuel does not agree with the volatility estimated from the cetane number of the fuel. This is because the cetane number is originally an indicator of the self-ignitability of fuels. Therefore, when the threshold temperature Tf is calculated on the basis of the relationship shown in FIG. 2, there may be cases where the threshold temperature Tf is not appropriate for the volatility of the presently used fuel. In such cases, there is a possibility that the fuel supplied through the fuel supply valve 5 for the $NO_X$ reduction process is not used sufficiently in reduction of $NO_X$ in the NSR catalyst 3 but adheres to the NSR catalyst 3. If the fuel supplied by the fuel supply valve 5 adheres to the NSR catalyst 3, there is a possibility that the activity of the NSR catalyst 3 may be deteriorated. The exhaust gas purification system for the internal combustion engine 1 according to the present disclosure is configured to perform the $NO_X$ reduction control shown in FIG. 4 in order to avoid the adhesion of fuel to the NSR catalyst 3 and to enable fuel to be appropriately used in reduction of $NO_X$ in the NSR catalyst 3, even in cases where the actual volatility of the fuel and the volatility estimated from the cetane number of the fuel do not agree with each other as described above. This $NO_X$ reduction control is a control process that is performed repeatedly by execution of a certain control program in the ECU 20.

Firstly in step S201, it is determined whether or not the amount of $NO_X$ stored in the NSR catalyst 3 (the $NO_X$ storage amount) reaches or exceeds the predetermined $NO_X$ storage amount to require the execution of the $NO_X$ reduction process. In other words, it is determined whether or not a $NO_X$ reduction request is made. The amount of $NO_X$ stored in the NSR catalyst 3 is determined by another process by integrating the quantity of $NO_X$ stored into the NSR catalyst 3 per unit time since the end of the last time execution of the $NO_X$ reduction process. The quantity of $NO_X$ stored into the NSR catalyst 3 per unit time is calculated on the basis of the operation state of the internal combustion engine 1. Alternatively, the quantity of $NO_X$ stored into the NSR catalyst 3 per unit time can be calculated by integrating the difference between the quantity of $NO_X$ flowing into the NSR catalyst 3 per unit time and the quantity of $NO_X$ flowing out of the NSR catalyst 3 per unit time. The quantity of $NO_X$ flowing into the NSR catalyst 3 per unit time may be estimated on the basis of the operation state of the internal combustion engine 1 or calculated as the product of the measurement value of an $NO_X$ sensor provided upstream of the NSR catalyst 3 and the exhaust gas flow rate. The quantity of $NO_X$ flowing out of the NSR catalyst 3 per unit time may be calculated as the product of the measurement value of an $NO_X$ sensor provided downstream of the NSR catalyst 3 and the exhaust gas flow rate. If the $NO_X$ storage amount determined as above is larger than or equal to the predetermined $NO_X$ storage amount, it is determined that a request for the $NO_X$ reduction process is made. If an affirmative determination is made in step S201, the process proceeds to step S202. If a negative determination is made in step S201, the $NO_X$ reduction control is terminated.

In step S202, the aforementioned threshold temperature Tf as the threshold of the exhaust gas temperature for starting the $NO_X$ reduction process is read from the memory of the ECU 20. The threshold temperature Tf is set by a threshold temperature setting process shown in FIG. 5, which is executed separately form the $NO_X$ reduction control, and memorized in the memory of the ECU 20. As described above, the threshold temperature Tf is a threshold of the exhaust gas temperature that is set in order to allow the supply of fuel to be performed at as low an exhaust gas temperature as possible taking account of the reaction of fuel and $NO_X$ in the NSR catalyst 3. The threshold temperature setting process will be specifically described later. After the completion of the processing of step S202, the process proceeds to step S203.

In step S203, it is determined whether or not the present temperature of the exhaust gas flowing into the NSR catalyst 3 is higher than the threshold temperature Tf read in step S202. In other words, it is determined in step S203 whether or not the exhaust gas temperature measured by the first temperature sensor 6 (i.e. the temperature of the exhaust gas flowing into the NSR catalyst 3) is appropriate for reduction of $NO_X$ by fuel in the NSR catalyst 3, in order to determine whether the $NO_X$ reduction process may be started. If an affirmative determination is made in step S203, the process proceeds to step S204. If a negative determination is made, the $NO_X$ reduction control is terminated.

In step S204, the $NO_X$ reduction process is started, which is the process of supplying fuel to the exhaust gas in order to desorb and reduce $NO_X$ stored in the NSR catalyst 3. In the $NO_X$ reduction process, the quantity of fuel supplied through the fuel supply valve 5 is controlled so as to adjust the air-fuel ratio of the exhaust gas flowing into the NSR catalyst 3 to an appropriate air-fuel ratio (which will be hereinafter referred to as the "air-fuel ratio suitable for reduction") that enables well-balanced desorption and reduction of $NO_X$ stored in the NSR catalyst 3. This air-fuel ratio suitable for reduction is determined in advance on the basis of experiment or simulation. The quantity of supplied fuel is controlled so as to adjust the air-fuel ratio of the exhaust gas flowing into the NSR catalyst 3 to the aforementioned air-fuel ratio suitable for reduction. For example, the quantity of supplied fuel is controlled on the basis of the difference between the air-fuel ratio of the air-fuel mixture burned in the cylinder of the internal combustion engine 1 and the air-fuel ratio suitable for reduction. Since an affirmative determination is made in step S203, the quantity of supplied fuel is determined on the assumption that the supplied fuel has appropriate volatility to contribute to reduction of $NO_X$ in the NSR catalyst 3. The fuel supplied to the exhaust gas by the fuel supply valve 5 flows into the NSR catalyst 3 to reduce desorbed $NO_X$. After the completion of the processing of step S204, the process proceeds to step S205.

In step S205, the quantity of heat $\Delta Tc$ generated in the NSR catalyst 3 per unit time by the $NO_X$ reduction process started in step S204 is calculated. This heat quantity $\Delta Tc$ represents the heat of reduction of $NO_X$ by fuel in the NSR catalyst 3. Specifically, the quantity of heat $\Delta Tc$ generated in the NSR catalyst 3 per unit time is calculated from the change in the temperature of the exhaust gas flowing out of the NSR catalyst 3 per unit time, the temperature being measured by the second temperature sensor 7. After the completion of the processing of step S205, the process proceeds to step S206.

In step S206, it is determined whether or not the heat quantity $\Delta Tc$ calculated in step S205 is smaller than a specific value Tc0. The aforementioned specific value Tc0 is the heat quantity expected to be generated by reduction of $NO_X$ by fuel in the NSR catalyst 3 that is assumed to occur with the fuel supplied by the fuel supply valve 5 in the $NO_X$ reduction process started in step S204. More specifically, the specific value Tc0 is set equal to the heat of reaction that would be generated when a quantity of fuel supplied though the fuel supply valve 5 per unit time during the $NO_X$ reduction process reacts with $NO_X$ stored in the NSR catalyst 3 in the case where the fuel supplied through the fuel supply valve 5 has an assumed volatility. This heat of reaction may change depending on some factors such as the quantity of fuel supplied through the fuel supply valve 5 per unit time and the temperature of the NSR catalyst 3. Therefore, the specific value Tc0 may be changed according to these factors if necessary. If an affirmative determination is made in step S206, then it means that the volatility of fuel is insufficient contrary to the above assumption and the heat of reduction reaction of $NO_X$ is not generated satisfactorily in the NSR catalyst 3. Then, in step S207, the $NO_X$ reduction process in progress is suspended, namely the supply of fuel to the exhaust gas by the fuel supply valve 5 is stopped. Moreover, in step S208, since it is considered, as above, that the volatility of fuel is insufficient contrary to the above assumption and the heat of reduction reaction of $NO_X$ is not generated satisfactorily in the NSR catalyst 3, a request for adjusting the threshold temperature Tf upward (i.e. to a higher temperature) is made. In other words, it is requested that the threshold temperature Tf for starting the $NO_X$ reduction process be changed to a higher temperature in order to ensure sufficient volatility of fuel. In response to this request, an updated threshold temperature Tf is set in the memory of the ECU 20 by a threshold temperature setting process that will be described later. This request is maintained until the supply of fuel is performed in the internal combustion engine 1 next time and reset (or cancelled) upon the next supply of fuel.

If a negative determination is made in step S206, then it means that the fuel exhibits sufficient volatility as assumed and the heat of reduction reaction of $NO_X$ is generated satisfactorily in the NSR catalyst 3. Then, the process proceeds from S206 to S209. In this case, the $NO_X$ reduction process is continued. In step S209, it is determined whether or not the $NO_X$ reduction process started in step S204 is to be terminated. Specifically, for example, it is determined whether or not a length of time long enough to desorb and reduce $NO_X$ stored in the NSR catalyst 3 by supply of fuel to the NSR catalyst 3 by the $NO_X$ reduction process has elapsed since the start of the $NO_X$ reduction process. If an affirmative determination is made in step S209, the process proceeds to step S210, where the $NO_X$ reduction process is stopped. If a negative determination is made in step S209, the processing of step S209 is executed again.

Figure 5:
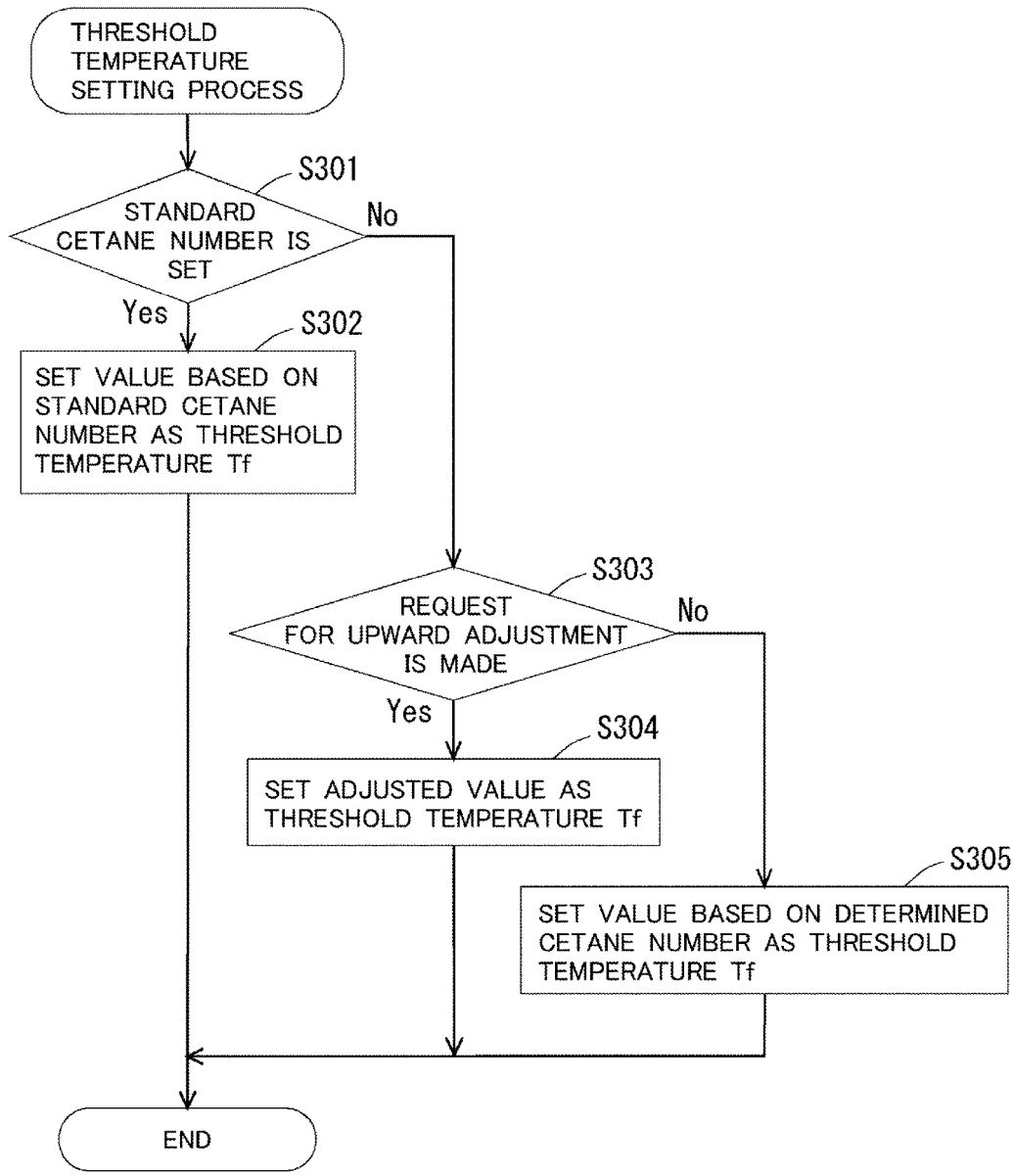
FIG. 5 is a flow chart of a process for setting the threshold of the exhaust gas temperature for starting the $NO_X$ reduction process.

Next, the threshold temperature setting process of setting the threshold temperature Tf as the threshold of the exhaust gas temperature at which the $NO_X$ reduction process is to be started will be described with reference to FIG. 5. The threshold temperature setting process is a control process that is performed repeatedly by execution of a certain control program in the ECU 20. This control process is performed independently from the above-described $NO_X$ reduction control. Firstly in step S301, it is determined whether or not the standard cetane number (cf. the processing of step S102 in the cetane number setting process) is set in the memory of the ECU 20 as the cetane number of the fuel.

If an affirmative determination is made in step S301, the process proceeds to step S302. In step S302, on the basis of the relationship between the cetane number of the fuel and the threshold temperature Tf shown in FIG. 2, a value of the threshold temperature corresponding to the standard cetane number is set as the threshold temperature Tf.

If a negative determination is made in step S301, the process proceeds to step S303. In step S303, it is determined whether or not a request for upward adjustment of the threshold temperature Tf is made in the processing of step S208 in the $NO_X$ reduction control. If an affirmative determination is made in step S303, the process proceeds to step S304, where a value of the threshold temperature adjusted to a higher temperature is set as the threshold temperature Tf in response to the request. The amount of change in the threshold temperature by this adjustment may be, for example, a predetermined value. After the above-described setting of the threshold temperature Tf is done, the request for upward adjustment of the threshold temperature is reset (or cancelled).

If a negative determination is made in step S303, the process proceeds to step S305, where a value of the threshold temperature corresponding to the cetane number determined by the cetane number determination process in step S106 is set as the threshold temperature Tf on the basis of the relationship between the cetane number of the fuel and the threshold temperature Tf shown in FIG. 2.

Figure 4:
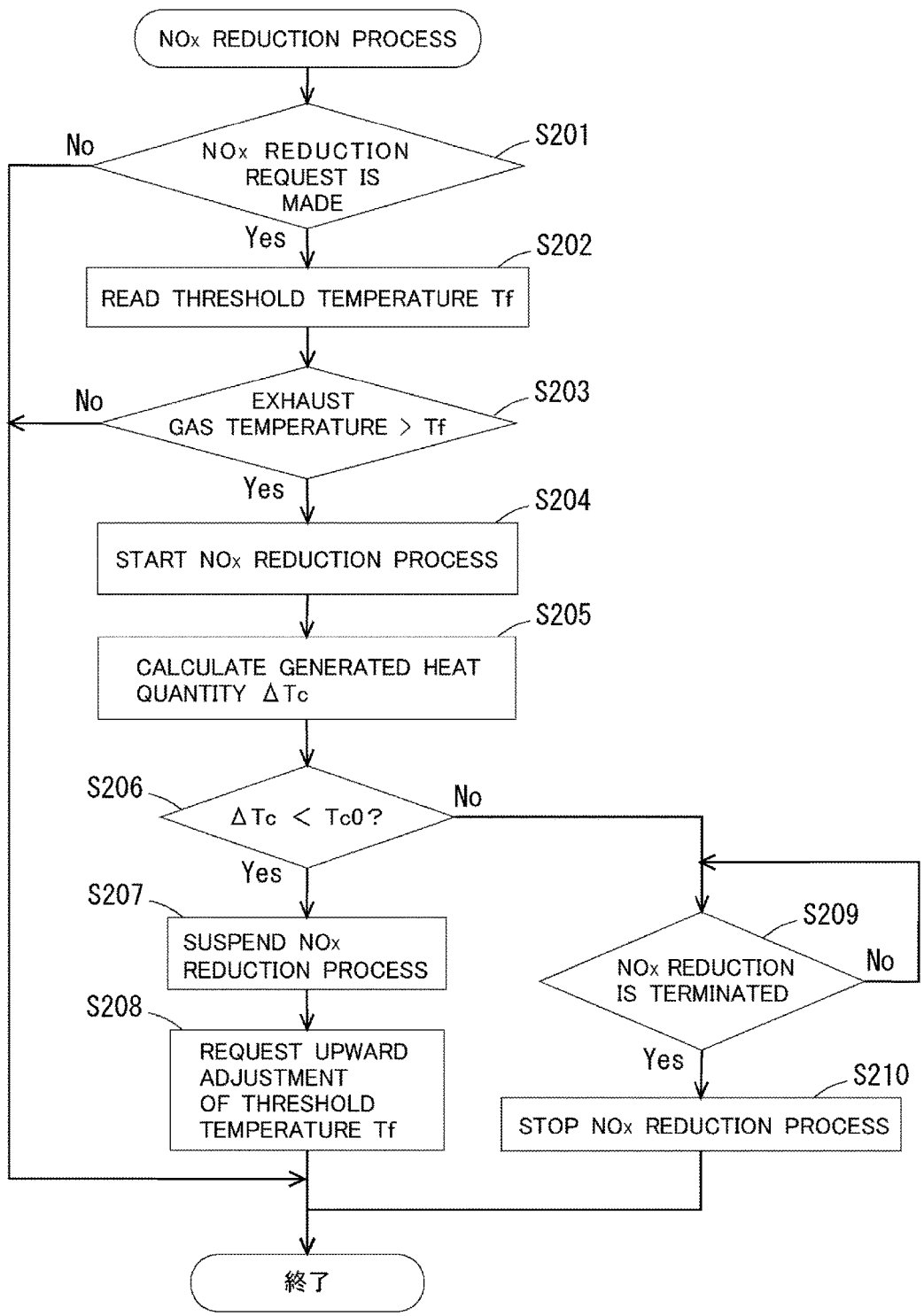
FIG. 4 is a flow chart of an $NO_X$ reduction control executed in the exhaust gas purification system for an internal combustion engine shown in FIG. 1 according to a first embodiment of the present disclosure.

As above, by performing the $NO_X$ reduction control shown in FIG. 4 using the threshold temperature Tf set by the threshold temperature setting process, the timing of supplying fuel to the exhaust gas through the fuel supply valve 5 for the $NO_X$ reduction control is adjusted appropriately. Basically, the threshold of the exhaust gas temperature at which the supply of fuel for the $NO_X$ reduction process is to be started is adjusted taking account of the volatility of fuel that is estimated from the cetane number of the fuel. However, in cases where the volatility estimated on the basis of the cetane number of the fuel is lower than the actual volatility of the fuel, the supply of fuel for the $NO_X$ reduction process is suspended and the threshold of the exhaust gas temperature at which the supply of fuel is to be started is changed to a higher temperature. In that case, when the temperature of the exhaust gas flowing into the NSR catalyst 3 exceeds the upwardly adjusted threshold, the supply of fuel for the $NO_X$ reduction process is performed. Then, the fuel supplied to the exhaust gas in order to desorb and reduce $NO_X$ stored in the NSR catalyst 3 will be supplied in an environment in which the fuel exhibits excellent volatility. Therefore, the supply of fuel can be performed at as low a temperature as possible without causing a deterioration of the activity of the NSR catalyst 3 due to adhesion of supplied fuel to the NSR catalyst 3. In consequence, the chance of performing the $NO_X$ reduction process can be increased. Every time fuel is supplied to the fuel tank 30 of the internal combustion engine 1, the cetane number of fuel is determined and the threshold of the exhaust gas temperature is set again. Therefore, even if the volatility of the fuel used in the internal combustion engine 1 changes by refueling, the supply of fuel to the exhaust gas for the $NO_X$ reduction process can be carried out appropriately.

Second Embodiment

Next, $NO_X$ reduction control according to a second embodiment of the present disclosure will be described with reference to flow charts shown in FIGS. 6 and 7. The processing steps in the $NO_X$ reduction control shown in FIGS. 6 and 7 that are the same as those in the $NO_X$ reduction control shown in FIG. 4 are denoted by the same reference signs and will not be described further.

Figure 6:
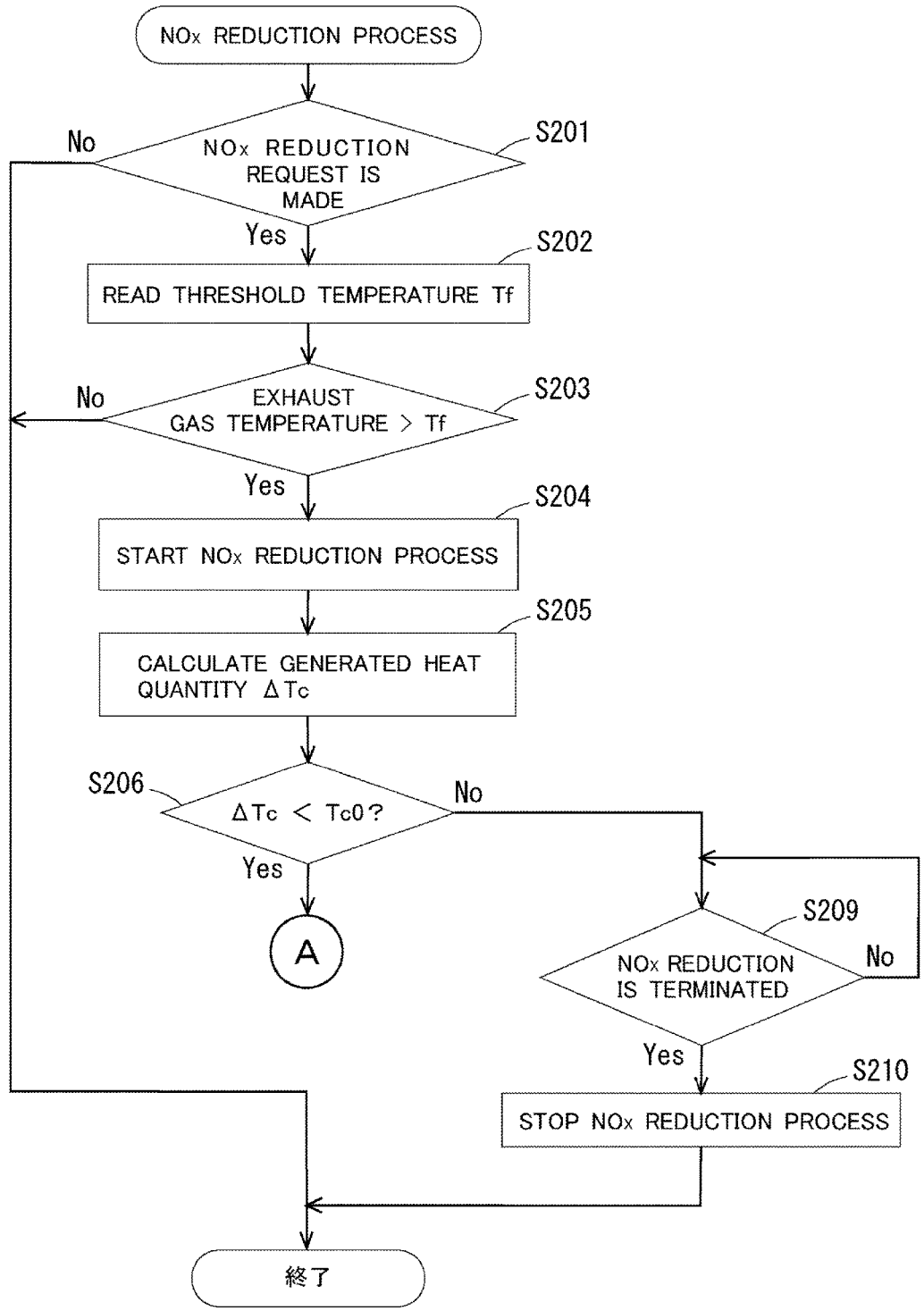
FIG. 6 is the first flow chart of the $NO_X$ reduction process executed in the exhaust gas purification system for an internal combustion engine shown in FIG. 1 according to a second embodiment of the present disclosure.
Figure 7:
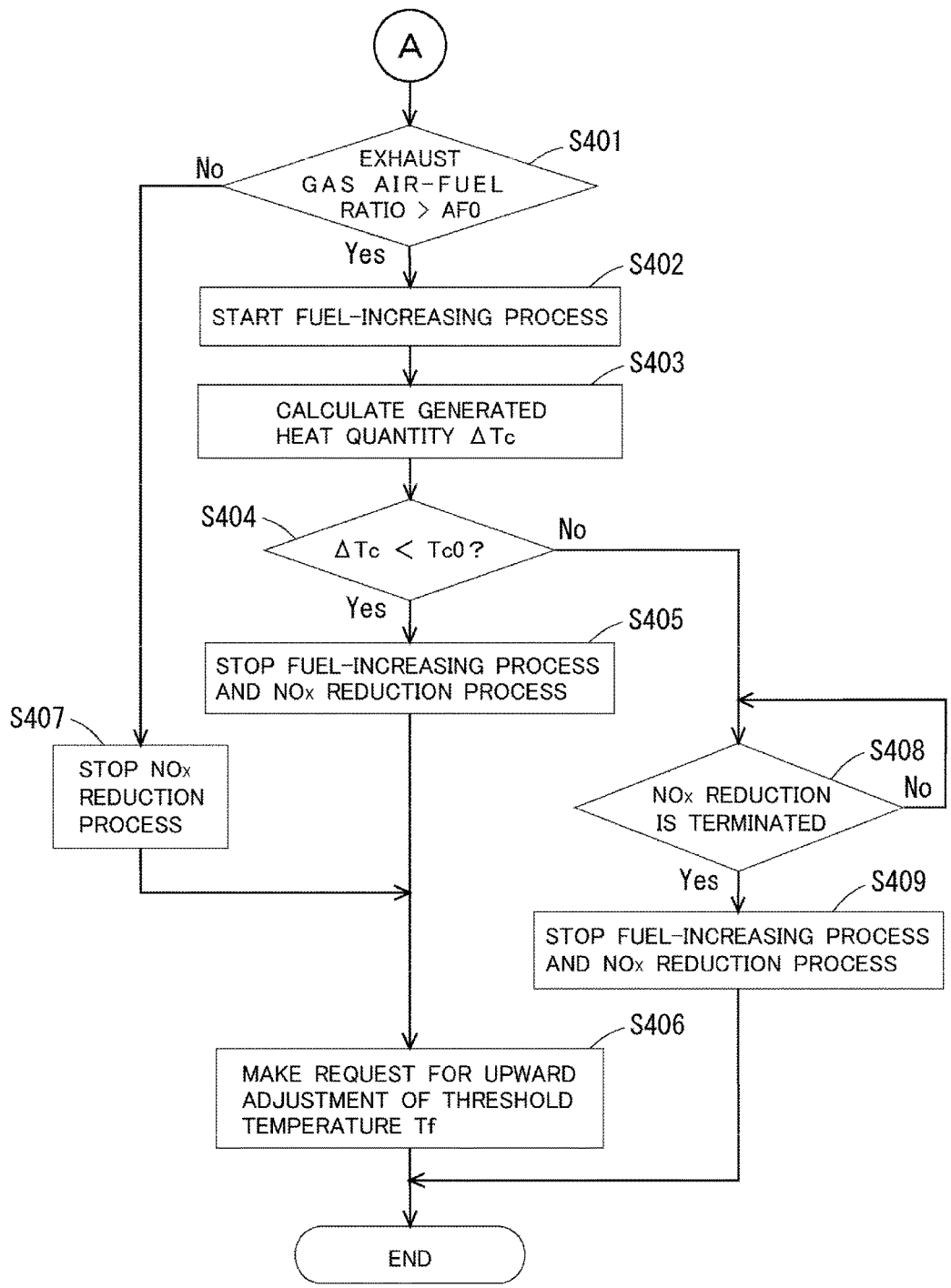
FIG. 7 is the second flow chart of the $NO_X$ reduction process executed in the exhaust gas purification system for an internal combustion engine shown in FIG. 1 according to the second embodiment of the present disclosure.

In the $NO_X$ reduction control shown in FIGS. 6 and 7, the processing of the steps S207 and S208 in the $NO_X$ reduction control shown in FIG. 4 is replaced by the processing of steps S401 to S409 in FIG. 7. Specifically, if an affirmative determination is made in step S206, the process proceeds to step S401.

In step S401, it is determined whether or not the air-fuel ratio of the exhaust gas flowing out of the NSR catalyst 3 measured by the air-fuel ratio sensor 8 is higher than a specific air-fuel ratio Af0, namely whether or not this exhaust gas air-fuel ratio is leaner than the specific air-fuel ratio. The specific air-fuel ratio is an air-fuel ratio of the exhaust gas that is assumed to be achieved taking account of the supply of fuel to the exhaust gas through the fuel supply valve 5 by the $NO_X$ reduction process started in step S204. For example, this exhaust gas air-fuel ratio may be equal to the aforementioned air-fuel ratio suitable for reduction. As fuel is supplied by the fuel supply valve 5 for the $NO_X$ reduction process, the exhaust gas temperature is raised by the fuel, and with the addition of the supplied fuel to the exhaust gas, the air-fuel ratio of the exhaust gas is expected to change to a corresponding air-fuel ratio, which is the aforementioned specific air-fuel ratio Af0. However, if the fuel supply valve 5 is in some trouble, namely if a trouble prevents the fuel supply valve 5 from supplying a requested quantity of fuel in response to a fuel supply request from the ECU 20, the quantity of supplied fuel will be smaller than the requested quantity. Then, the quantity of heat generated in the NSR catalyst 3 can be smaller, and the air-fuel ratio of the exhaust gas can be leaner than the aforementioned specific air-fuel ratio Af0. To detect this, the determination of step S401 is performed, whereby it is determined whether or not the supply of fuel by the fuel supply valve 5 is in trouble. If an affirmative determination is made in step S401, the process proceeds to step S402. If a negative determination is made, the process proceeds to step S407. In cases where an air-fuel ratio sensor that measures the air-fuel ratio of the exhaust gas flowing into the NSR catalyst 3 is provided upstream of the NSR catalyst 3, it may be determined in step S401 whether or not the air-fuel ratio of the exhaust gas flowing into the NSR catalyst 3 is higher than the specific air-fuel ratio Af0.

In step S402, since the air-fuel ratio of the exhaust gas flowing out of the NSR catalyst 3 is leaner than the specific air-fuel ratio Af0, a fuel-increasing process of increasing the quantity of fuel supplied through the fuel supply valve 5 in the $NO_X$ reduction process is started so as to adjust the air-fuel ratio of the exhaust gas to the specific air-fuel ratio Af0. This fuel-increasing process is a process of making up the shortfall from the quantity intended to be supplied in the $NO_X$ reduction process by making the quantity of fuel supplied by the fuel supply valve 5 in the $NO_X$ reduction process larger than that in the case where the fuel-increasing process is not performed. After the completion of the processing of step S402, the process proceeds to step S403, where the heat quantity ΔTc generated in the NSR catalyst 3 is calculated as in step S205 described above. Then, in step S404, it is determined whether or not the generated heat quantity ΔTc is smaller than a specific value Tc0 as in step S206. If an affirmative determination is made in step S404, the process proceeds to step S405. If a negative determination is made, the process proceeds to step S408.

If an affirmative determination is made in step S404, then it means that the quantity of fuel supplied by the fuel supply valve 5 is corrected to a proper quantity but the reduction reaction of $NO_X$ in the NSR catalyst 3 does not progress satisfactorily. Then, it is confirmed with higher reliability that the volatility of fuel is not sufficient at the time when the fuel is supplied. Therefore, if an affirmative determination is made in step S404 and the process proceeds to step S405, the $NO_X$ reduction process and the fuel-increasing process in progress are stopped. Thereafter, in step S406, a request for upwardly adjusting the threshold temperature Tf is made in order to ensure sufficient volatility of the fuel as in step S208.

If a negative determination is made in step S401, the processing of step S407 is executed. In step S407, the $NO_X$ reduction process in progress is stopped as in step S207. If a negative determination is made in step S401, then it means that although the reduction reaction of $NO_X$ in the NSR catalyst 3 does not progress satisfactorily, the quantity of fuel supplied by the fuel supply valve 5 is appropriate for the reduction reaction. In this case, it can be considered that it is not necessary to perform the fuel-increasing process in step S402 and the supply of fuel is performed in a condition in which the volatility of fuel is insufficient. Therefore, if a negative determination is made in step S401, the $NO_X$ reduction process is stopped immediately in step S407 without performing the fuel-increasing process, and thereafter the processing of step S406 is performed.

If a negative determination is made in step S404, then it means that an appropriate quantity of fuel is supplied thanks to the fuel-increasing process and the fuel exhibits sufficient volatility, so that the heat of reduction reaction of $NO_X$ is generated satisfactorily in the NSR catalyst 3. Then, the process proceeds from step S404 to step S408. In this case, the $NO_X$ reduction process is performed while continuing the fuel-increasing process. In step S408, it is determined whether or not the $NO_X$ reduction process started in step S204 is to be terminated, as in step S209. If an affirmative determination is made in step S408, the process proceeds to step S409, where the $NO_X$ reduction process and the fuel-increasing process are stopped. If a negative determination is made in step S408, the processing of step S408 is executed again.

As above, in the $NO_X$ reduction control according to the second embodiment, the upward adjustment of the threshold Tf of the exhaust gas temperature for starting the $NO_X$ reduction process is performed after determining the air-fuel ratio of the exhaust gas to which fuel has been supplied and performing the fuel-increasing process. Thus, the upward adjustment of the threshold of the exhaust gas temperature for starting the $NO_X$ reduction process is performed after excluding the possibility of insufficient reduction of $NO_X$ in the NSR catalyst 3 due to a trouble of the fuel supply valve 5. When the temperature of the exhaust gas flowing into the NSR catalyst 3 exceeds the adjusted threshold, the $NO_X$ reduction process is performed. Therefore, the supply of fuel for the $NO_X$ reduction process can be performed at as low a temperature as possible even if the fuel supply valve 5 is in trouble, and the chance of performing the $NO_X$ reduction process can be increased further.

Modification of Embodiments

In the $NO_X$ reduction control according to FIGS. 6 and 7, the processing of steps S401 and S402 relating to the compensation of the quantity of fuel supplied through the fuel supply valve 5 is performed after starting the $NO_X$ reduction process and after making the determination as to whether or not reduction of $NO_X$ in the NSR catalyst 3 is carried out appropriately (in the processing of step S206). Alternatively, the processing of steps S401 and S402 relating to the compensation of the quantity of fuel supplied through the fuel supply valve 5 may be performed after starting the $NO_X$ reduction process but before making the determination as to whether reduction of $NO_X$ in the NSR catalyst 3 is carried out appropriately. In this case, the determination as to whether reduction of $NO_X$ in the NSR catalyst 3 is carried out appropriately (i.e. the processing of step S206 or S404) is made after confirming the absence of a trouble of the fuel supply valve 5 and performing the compensation of the quantity of fuel supplied by the fuel supply valve 5.

Although the NSR catalyst 3 and the filter 4 are provided separately in the exhaust gas purification system for the internal combustion engine 1 shown in FIG. 1, the NSR catalyst 3 and the filter 4 may be integrated alternatively, namely the NSR catalyst 3 may be supported on the filter 4.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An exhaust gas purification system for an internal combustion engine comprising:
    an $NO_X$ storage reduction catalyst provided in an exhaust passage of the internal combustion engine, which stores $NO_X$ in exhaust gas when the exhaust gas has a lean air-fuel ratio higher than a theoretical air-fuel ratio and desorbs $NO_X$ stored in it to let the desorbed $NO_X$ be reduced by unburned fuel in the exhaust gas when the exhaust gas has a rich air-fuel ratio lower than the theoretical air-fuel ratio;
    a fuel supply device for supplying fuel to the exhaust gas upstream of the $NO_X$ storage reduction catalyst; and
    a controller comprising at least one processor,
    wherein the controller configured to:
    determine, after fuel is supplied to a fuel tank of the internal combustion engine, a cetane number of the fuel used in the internal combustion engine after the supply of fuel; and
    perform an $NO_X$ reduction process by supplying fuel to the exhaust gas through the fuel supply device when an amount of $NO_X$ stored in the $NO_X$ storage reduction catalyst is larger than or equal to a specific $NO_X$ storage amount and a temperature of the exhaust gas flowing into the $NO_X$ storage reduction catalyst exceeds a specific threshold temperature that is determined on the basis of the cetane number of the fuel, the threshold temperature being set lower when the cetane number of the fuel is low than when the cetane number of the fuel is high,
    wherein when a quantity of heat generated in the $NO_X$ storage reduction catalyst per unit time is smaller than a specific value while the $NO_X$ reduction process is being performed, the controller suspends the $NO_X$ reduction process in progress, and performs the $NO_X$ reduction process later on when the temperature of the exhaust gas flowing into the $NO_X$ storage reduction catalyst exceeds an updated threshold temperature higher than the specific threshold temperature.

2. The exhaust gas purification system for an internal combustion engine according to claim 1, wherein
    the controller is further configured to perform, when the air-fuel ratio of the exhaust gas to which fuel has been supplied by the fuel supply device is leaner than a specific air-fuel ratio suited to the $NO_X$ reduction process while the $NO_X$ reduction process is being performed, a fuel-increasing process of increasing a quantity of fuel supplied through the fuel supply device in the $NO_X$ reduction process so as to make the air-fuel ratio of the exhaust gas equal to the specific air-fuel ratio, wherein when the quantity of heat generated in the $NO_X$ storage reduction catalyst per unit time reaches or exceeds the specific value while the fuel-increasing process is being performed during the $NO_X$ reduction process, the controller continues the $NO_X$ reduction process with the fuel-increasing process being performed.

3. The exhaust gas purification system for an internal combustion engine according to claim 2, wherein when the quantity of heat generated in the $NO_X$ storage reduction catalyst per unit time is smaller than the specific value while the fuel-increasing process is being performed during the $NO_X$ reduction process, the controller suspends the $NO_X$ reduction process and the fuel-increasing process in progress and performs the $NO_X$ reduction process later on when the temperature of the exhaust gas flowing into the $NO_X$ storage reduction catalyst exceeds the updated threshold temperature.

* * * * *